United States Patent
Phillips

(10) Patent No.: US 9,719,768 B2
(45) Date of Patent: Aug. 1, 2017

(54) METHODS AND APPARATUS FOR ALIGNING VEHICLE COMPONENTS

(71) Applicant: Honda Motor Co., Ltd., Tokyo (JP)

(72) Inventor: Andrew Buchanan Phillips, Greensburg, IN (US)

(73) Assignee: HONDA MOTOR CO., LTD., Tokyo (JP)

(*) Notice: Subject to any disclaimer, the term of this patent is extended or adjusted under 35 U.S.C. 154(b) by 252 days.

(21) Appl. No.: 14/804,993

(22) Filed: Jul. 21, 2015

(65) Prior Publication Data

US 2017/0023346 A1   Jan. 26, 2017

(51) Int. Cl.
  *G01B 5/24*   (2006.01)
  *B60N 2/44*   (2006.01)
  *B60N 2/22*   (2006.01)
  *B62D 65/00*  (2006.01)

(52) U.S. Cl.
  CPC .......... *G01B 5/24* (2013.01); *B60N 2/22* (2013.01); *B60N 2/442* (2013.01); *B62D 65/00* (2013.01); *B62D 65/005* (2013.01)

(58) Field of Classification Search
  CPC ......... G01B 5/24; B60N 2/442; B62D 65/005
  USPC .......................................... 33/534, 538, 600
  See application file for complete search history.

(56) References Cited

U.S. PATENT DOCUMENTS

| | | | | |
|---|---|---|---|---|
| 2,959,861 A | * | 11/1960 | Stromquist | G01B 3/56 33/419 |
| 5,163,228 A | * | 11/1992 | Edwards | A61B 5/107 33/1 N |
| 5,189,804 A | * | 3/1993 | Ostachowski | G01B 3/56 33/1 N |
| 5,239,761 A | * | 8/1993 | Wu | G01B 5/24 33/342 |
| 5,564,195 A | * | 10/1996 | Kokot | A47C 31/126 33/1 BB |
| 6,209,213 B1 | * | 4/2001 | Moe | G01B 3/004 33/451 |
| 6,381,864 B1 | * | 5/2002 | Hayes | G01B 5/14 33/558.01 |
| 6,536,124 B1 | * | 3/2003 | Eskew | G01B 3/56 33/471 |
| 6,820,868 B1 | | 11/2004 | Reymus | |
| 7,237,344 B2 | | 7/2007 | Shishikura | |

(Continued)

FOREIGN PATENT DOCUMENTS

WO   2014/039957 A1   3/2014

*Primary Examiner* — Christopher Fulton
(74) *Attorney, Agent, or Firm* — Kenealy Vaidya LLP

(57) ABSTRACT

Some embodiments are directed to an indicator assembly for indicating an orientation between a vehicle seat back and a seat bottom. The indicator assembly can include an outer plate assembly that is configured to be supported by the seat bottom, and a movable plate that is movably supported by the outer plate assembly. A biasing device can apply a biasing force to bias the movable plate toward the seat back when the outer plate assembly is supported by the seat bottom to thereby define a projecting portion of the movable plate. The biasing device can enable the movable plate to move upon application of a force to the projecting portion that is greater than the biasing force. An indicator can indicate a relative orientation between the seat back and the seat bottom based on the amount of movement of the movable plate.

20 Claims, 5 Drawing Sheets

(56) References Cited

U.S. PATENT DOCUMENTS

| | | | | |
|---|---|---|---|---|
| 7,406,774 B2* | 8/2008 | Shapiro | .................. | G01B 3/563 |
| | | | | 33/471 |
| 7,513,057 B2* | 4/2009 | Robison | .................... | B43L 7/10 |
| | | | | 33/471 |
| 8,047,595 B2* | 11/2011 | Bach | .................... | B60N 2/3011 |
| | | | | 296/65.08 |
| 8,341,850 B2* | 1/2013 | Merchant | ............. | A61B 5/1071 |
| | | | | 33/1 N |
| 2007/0215392 A1 | 9/2007 | Lee et al. | | |
| 2015/0101206 A1* | 4/2015 | Smith | .................... | G01B 3/563 |
| | | | | 33/534 |

* cited by examiner

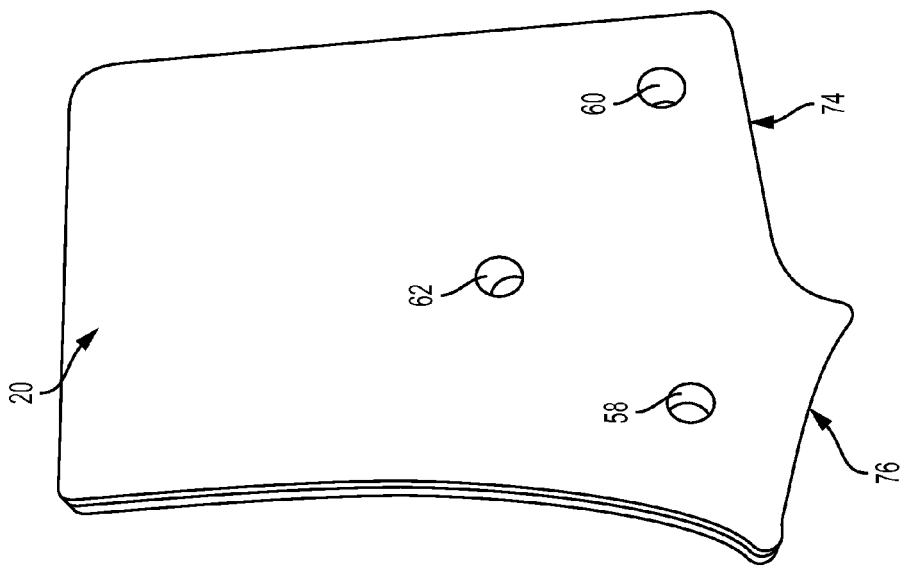
FIG. 10
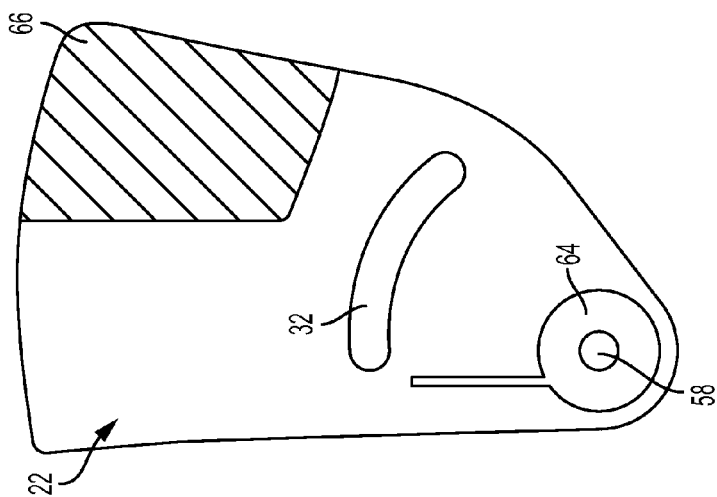
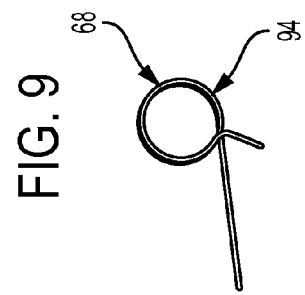
FIG. 9
FIG. 11
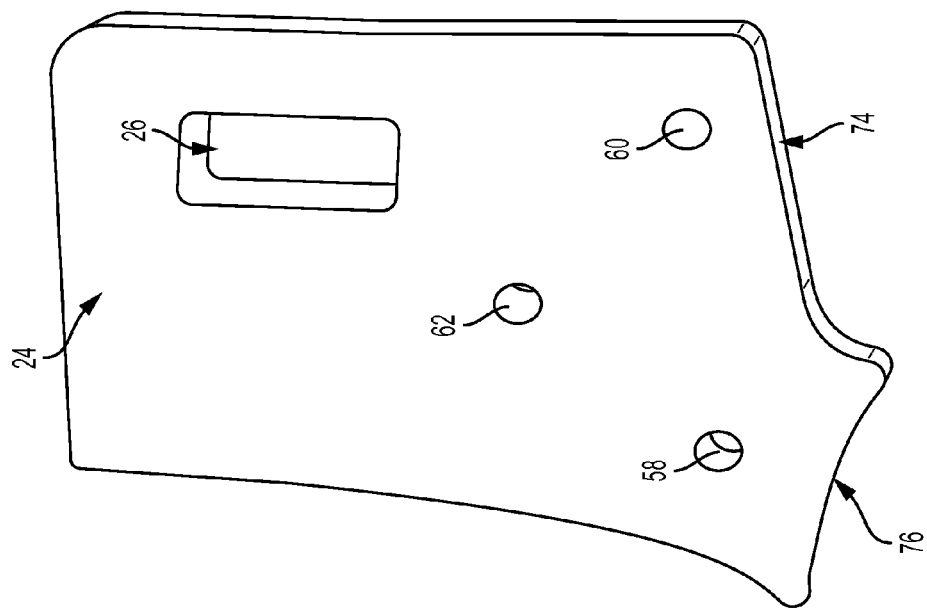
FIG. 8

METHODS AND APPARATUS FOR ALIGNING VEHICLE COMPONENTS

BACKGROUND

The disclosed subject matter relates to methods and apparatus for aligning vehicle components. More particularly, the disclosed subject matter relates to achieving or otherwise obtaining a predetermined relative orientation between at least two vehicle components, such as but not limited to components of a vehicle seat.

Various complex and semi-complex mechanical and electro-mechanical apparatus are constituted by an assembly of multiple components. As one example, many different types of vehicles, such as those that travel on land, water, air, etc., include many different components, and it may be necessary or beneficial to align or otherwise orient some of these components relative to each other.

SUMMARY

In the context of vehicles, certain elements of seats may need to be oriented relative to each other. Some of these seats include a seat back and a seat bottom. The seat bottom may include a generally planar upper surface that is substantially parallel to a surface on which the vehicle travels, and may be configured to support a user's pelvic area. The seat back may be configured to support a user's back, and may include an upper surface that extends at an angle relative to the upper surface of the seat bottom. Ends of the seat back and seat bottom can be connected to each other or otherwise relatively disposed so that both elements cooperate to support a user occupying the seat, with the seat bottom supporting the user's pelvic area and the seat back supporting the user's back.

It may be advantageous under certain circumstances to align the seat back and seat bottom relative to each other so as to define a predetermined angle between their upper surfaces. For example, circumstances may arise during manufacturing, assembly, maintenance, etc., where it may be helpful to orient the seat back relative to the seat bottom so as to define this relative predetermined angle. These circumstances may vary depending on the type of seat, seat operation, etc.

Some seats may be designed to prevent a user from adjusting the relative angle between the seat back and seat bottom. Thus, it may be necessary or beneficial to orient the seat back to define a certain angle with the seat bottom during installation. The seat back and seat bottom may be oriented as desired, and then rigidly attached to a structural element of the vehicle, such as by rivets, bolts, etc.

Alternatively, some other seats may permit a user to perform certain adjustments of the seat bottom and/or seat back, such as in forward and backward directions along a longitudinal axis of the vehicle, as well as up and down directions toward and away from a surface on which the vehicle travels. In addition, the relative angle between the upper surfaces of the seat back and seat bottom can be adjusted by a user, such as by re-orienting the seat back, e.g., pivoting the seat back along an arcuate path relative to the seat bottom. These adjustments can be performed either manually, using electric motors, etc.

Adopting a predetermined relative alignment or orientation between the upper surfaces of the seat back and seat bottom may be especially beneficial for seats capable of this type of adjustability. For example, it may be beneficial for the seat back to adopt a certain predetermined orientation, which can be designated as constituting a forward most orientation during installation, and to then initialize the seat adjustment system to set that orientation as the forward-most limit. This initialization process may then prevent the seat from being oriented beyond this limit during normal operation. Alternatively or additionally, it may be desirable to adopt a predetermined orientation to ensure that the installed seat is capable of at least adopting that orientation, such as in accordance with a quality control process. Still further, adopting a predetermined orientation may be beneficial in calibrating certain components, such as seat weight sensors (SWSs) that are installed in the seating assembly. However, the above scenarios are merely provided for exemplary purposes.

It may therefore be beneficial to provide methods and apparatus for facilitating alignment of certain vehicle components, such as a seat back and a seat bottom, relative to each other to achieve a desired relative orientation. For example, it may be beneficial to facilitate the alignment of top surfaces of the seat back and seat bottom so as to define a predetermined angle therebetween. Some of these methods and apparatus provide an indication as to when the seat back and seat bottom adopt the desired predetermined orientation, i.e., define the predetermined relative angle between their top surfaces. In some of these embodiments, a user disposes an indicator at an appropriate location, and then manipulates the seat back (such as via rotation) until the indicator provides an indication that the seat back has achieved the desired orientation relative to the seat bottom.

Some embodiments are therefore directed to an indicator assembly for indicating an orientation between a vehicle seat back and a seat bottom. The indicator assembly can include an outer plate assembly that defines a bottom surface configured to be supported by the seat bottom, and a back surface that faces the seat back when the bottom surface is supported by the seat bottom. The back surface can define a plane that intersects a plane defined by the bottom surface. A movable plate can be movably supported by the outer plate assembly. A biasing device can apply a biasing force to bias the movable plate toward the seat back when the bottom surface of the outer plate assembly is supported by the seat bottom to thereby define a projecting portion of the movable plate that projects from the back surface of the outer plate assembly toward the seat back. The biasing device can also enable the movable plate to move upon application of a force greater than the biasing force in a direction opposite from the biasing force to reduce a size of the projecting portion that projects from the back surface of the outer plate assembly. An indicator can communicate with the movable plate to indicate a relative orientation between the seat back and the seat bottom based on the size of the projecting portion that projects from the back surface of the outer plate assembly.

Some other embodiments are directed to a method of manufacturing an indicator assembly for indicating an orientation between a vehicle seat back and a seat bottom. The method can include: configuring an outer plate assembly to define a bottom surface that can be supported by the seat bottom, and a back surface to face the seat back when the bottom surface is supported by the seat bottom, such that the back surface defines a plane that intersects a plane defined by the bottom surface; supporting a movable plate with the outer plate assembly to enable movement of the movable plate; configuring a biasing device to apply a biasing force to bias the movable plate toward the seat back when the bottom surface of the outer plate assembly is supported by the seat bottom to thereby define a projecting portion of the movable plate that projects from the back surface of the outer plate assembly toward the seat back; disposing the movable plate so as to be movable upon application of a force greater than the biasing force in a direction opposite from the biasing force to reduce a size of the projecting portion that projects from the back surface of the outer plate assembly; and disposing an indicator so as to indicate a relative orientation between the seat back and the seat bottom based on the size of the projecting portion that projects from the back surface of the outer plate assembly.

Still other embodiments are directed to a method of indicating an orientation between a vehicle seat back and a seat bottom. The method can include: moving the seat back to adopt a reclined position; placing an indicator assembly on the seat bottom, such that a bottom surface of an outer plate assembly of the indicator assembly is supported by the seat bottom, and a back surface of the outer plate assembly faces the seat back; moving the seat back in an inclined direction to contact a movable plate of the indicator assembly that is movably supported by the outer plate assembly; continuing movement of the seat back in the inclined direction to apply a force that exceeds a biasing force applied by a biasing device of the indicator assembly in a direction that is opposite to the direction of the force applied by the seat back so as to move the movable plate in the direction of the force applied by the seat back; and monitoring an indicator that communicates with the movable plate to determine a relative orientation between the seat back and the seat bottom based on the amount of movement of the movable plate.

BRIEF DESCRIPTION OF THE DRAWINGS

FIG. 8 is a perspective view of an exemplary left plate of the seat recline fixture of FIG. 4.

FIG. 9 is a side view of the center plate of the seat recline fixture of FIG. 4.

FIG. 10 is a perspective view of an exemplary right plate of the seat recline fixture of FIG. 4.

FIG. 11 is a side view of a torsion spring that may be seated in a torsion spring fixture of the seat recline fixture of FIG. 4.

DETAILED DESCRIPTION OF SOME EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Seating Assembly Overview and Seat Weight Sensors (SWS)

Figure 1:
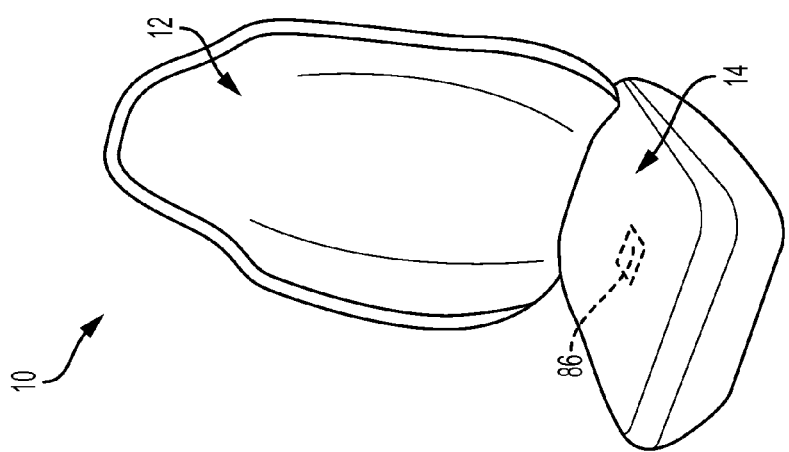
FIG. 1 is a perspective view of an exemplary seating assembly including a seat back, seat bottom, and seat weight sensor.

FIG. 1 is a perspective view of an exemplary seating assembly 10 including a seat back 12, seat bottom 14, and seat weight sensor (SWS) 86. The seating assembly 10 of FIG. 1 is configured to accommodate a seated position of the vehicle's operator or passengers, such as during operation of the vehicle.

Embodiments are intended to include or otherwise cover any type of seating assembly 10. For example, the seating assembly 10 may include features or structures to facilitate comfort, to enable installation, etc. The seating assembly 10 may also include special contours that are designed to accommodate specific bodily features, such as an occupant's head, back, hips, legs, etc.

The SWS 86 of FIG. 1 is configured to detect a downward force applied to the seat bottom 14, and thus can detect whether an operator or passenger is physically present in the seating assembly 10, whether the seating assembly 10 is merely supporting cargo, etc. The SWS 86 may be disposed at any location to perform this operation, such as in the seat bottom 14 (as shown in FIG. 1), or any other location.

The SWS 86 can be used with a controller (not shown) to make determinations based on the conditions sensed by the SWS 86. For example, if the SWS 86 senses that cargo is present in the seating assembly 10, then the controller may determine that it may not be necessary to perform certain vehicle functions, such as deploying an airbag in the case of a collision. It may also be desirable to not deploy airbags if a child (occupying a child's seat) is present in the seating assembly 10 (for safety purposes). The controller may be able to make those determinations based on simple relays, analog input/output devices, digital input/output devices, a processor, etc.

Figure 2:
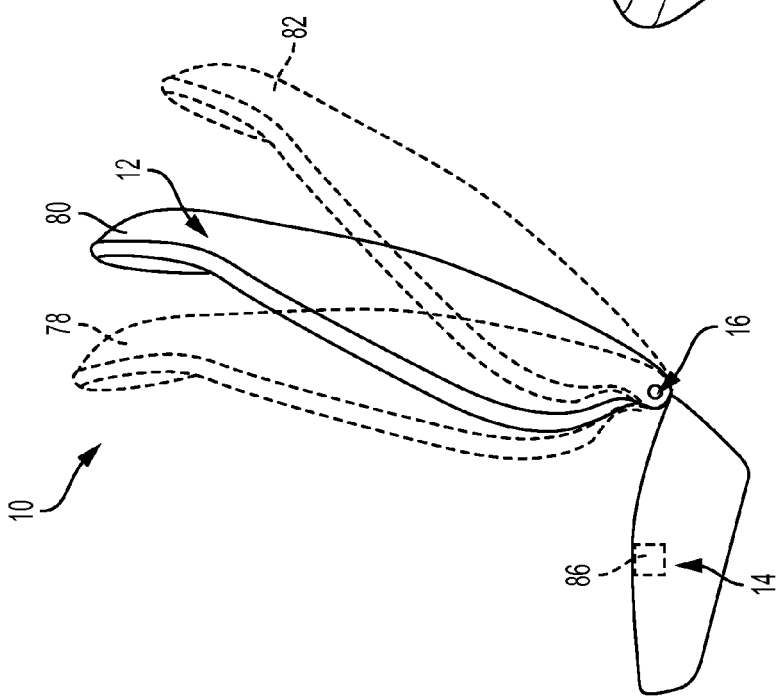
FIG. 2 is a side view of the seating assembly of FIG. 1, and illustrates exemplary angles of inclination of the seat back relative to the seat bottom.

FIG. 2 is a side view of the seating assembly 10 of FIG. 1, and illustrates exemplary angles of inclination of the seat back 12 relative to the seat bottom 14. Thus, the seating assembly 10 of this embodiment is provided with the capability of reclining at various angles (i.e., the seat back 12 approaching a position where it is parallel to the seat bottom 14) for various reasons, such as to facilitate user comfort.

The seat back 12 can be connected to the seat bottom 14 or any other structural element by a seat hinge 16. The seat hinge 16 can be in the form of a cylinder, and configured to enable the seat back 12 to rotate about an axis of the seat hinge 16. The seat hinge 16 can be formed of any material, such as metal, synthetic resin, composite materials, or any combination of these materials or any other material. Embodiments are intended to include or otherwise cover any way of connecting the seat back 12 to the seat bottom 14 or other vehicle components.

As shown in FIG. 2, the seat hinge 16 enables the seat back 12 to be rotated to adopt a relatively forward position 78, a relatively rearward position 82, and an intermediate position 80. The position of the seat back 12 may not only affect occupant comfort, but also operation of the SWS 86. For example, a reclined seat back 12 may cause the occupant's weight on the seat bottom 14, and hence the weight registered by the SWS 86 disposed in the seat bottom 14, to reflect a value that is less than the actual weight of the occupant. An explanation of this phenomenon is provided below.

When an object causing a force (such as an object having weight, like a fixed predetermined weight, a vehicle operator or passenger, etc.) is distributed along an angled surface defined by rays (or planes, which are the extension of rays in three dimensions), a portion of the weight usually presses down on both rays. In the case of a perfectly right angle (an idealized physical situation), 100% of the operator's weight would be directed downwards, because the amount of force due to gravity on the seat back 12 is proportional to the cosine of the angle of inclination δ between the seat back 12 and seat bottom 14. This force will be zero for an angle of inclination of 90° (or π/2 radians), because the force on the SWS 86 in the seat bottom 14, mg*Sin [90°]=mg, and the force on the seat back 12, mg*Cos [90°]=0. This implies an angle which is an ideal right angle, meaning that all of the weight is being directed downwards on the seat bottom 14.

However, when the seating assembly 10 is reclined at an angle greater than this value (i.e., in a reverse position, where the seat back 12 is in an obtuse angular position relative to the seat bottom 14), some of the operator's weight can impinge on the seat back 12. That is, when a portion of an operator or passenger's weight is distributed over the angled surface, the weight registered by a SWS 86 in the seat bottom 14 would be less than a value registered if the seating assembly 10 were in an upright position. Thus, if an installation, maintenance or repair technician (or an operator, passenger, or anyone else servicing, occupying or otherwise maintaining the vehicle) is attempting to calibrate SWS 86, then it may be important to set the angle of inclination of the seating assembly 10 to a known (predetermined or preferred) angle to maintain a uniform SWS 86 calibration between vehicles. In addition, there are many other reasons to return the seating assembly 10 to a predetermined state as have been previously mentioned.

Thus, it may be beneficial to adopt a desired predetermined orientation between the seat back 12 and the seat bottom 14 to calibrate the SWS 86. Standardizing the seating assembly 10 angle of inclination during SWS 86 calibration may be useful for many reasons. For example, not only may standardizing the angle of inclination during calibration allow a controller (not shown) to accurately perform calculations to determine the weight of a payload occupying the seating assembly 10, but the controller may also use this calculated weight to compare the payload to a pre-programmed standard.

This standard may be used to determine whether to perform vehicle functions (such as deploying passenger-side airbags, air conditioning, lighting, etc.). In addition to making airbag deployment decisions, the controller may also make decisions relating to performing other vehicle functions based on the SWS 86, such as whether to activate/deactivate a passenger side air conditioning unit, or to enable/disable passenger side lighting, media units (such as a monitor), etc. These decisions may be made wholly or in part based on information provided by the SWS 86 as a result of the accurately detected weight of an occupant or cargo supported by the seating assembly 10.

II. Seat Recline Fixture

A. Explanation Based on Figures

FIGS. 3-11 illustrate a first embodiment in which a seat recline fixture 18 is used to determine or otherwise indicate a certain angle defined between upper surfaces of the seat back 12 and seat bottom 14. Each of these figures is discussed below.

Figure 3:
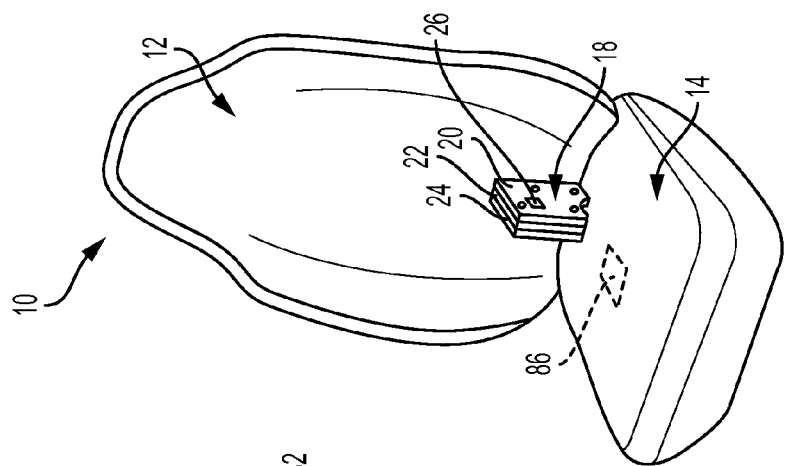
FIG. 3 is a perspective view of the seating assembly of FIG. 1, with a seat recline fixture that is capable of detecting the angle of inclination of the seat back relative to the seat bottom.

FIG. 3 is a perspective view of the seating assembly 10 of FIG. 1, with the seat recline fixture 18 that is capable of detecting the angle of inclination of the seat back 12 relative to the seat bottom 14. In FIG. 3, the seating assembly 10 has been temporarily fitted with the seat recline fixture 18 to calibrate, record and/or reset the angle of inclination defined by the angle of the seat back 12 and the seat bottom 14 of the seating assembly 10.

The seat recline fixture 18 is capable of detecting the angle of inclination of the seat back 12 relative to the seat bottom 14, or alternatively about the axis of the seat hinge 16. As illustrated in FIG. 3, the seat recline fixture 18 may be composed of three separate plates, including a right plate 20, a center plate 22, and a left plate 24. The seat recline fixture 18 can also include a viewing window 26. In summary, and as discussed in much more detail below with regard to the other figures, the center plate 22 is movable (such as by rotation) relative to the right and left plates 20, 24 based on a force applied to the center plate 22. In a default position, the center plate 22 protrudes beyond the right and left plates 20, 24, and a sufficient external force applied to the protruding portion of the center plate 22 moves the protruding portion to be between the right and left plates 20, 24. This movement affects or otherwise changes the region of the center plate 22 that is viewable through the viewing window 26.

As illustrated in FIG. 3, in operation, the seat recline fixture 18 can be positioned in the center of the seating assembly 10, although it may be disposed for use in other positions as well. In this position, the protruding portion of the center plate 22 is disposed facing the seat back 12. Thus, rotating or otherwise moving the seat back 12 forwardly (such as from either the intermediate or rearward positions 80, 82 of FIG. 2) toward the forward position 78, causes the seat back 12 to contact the protruding portion of the center plate 22 and to move the center plate 22 with the seat back 12. This movement thereby causes the protruding portion of the center plate 22 to be disposed between the right and left plates 20, 24. This movement also changes the region of the center plate 22 that is viewable through the viewing window 26, and thereby provides an indication of the relative position or orientation of the seat back 12.

Embodiments are intended to include or otherwise cover any methods or apparatus for providing this indication. For example, the exterior surface of the center plate 22 can include markings that are visible through the viewing window 26 to indicate the relative position of the center plate 22. Alternatively, elements that are separate from the center plate 22 can be provided to enable this indication.

Figure 4:
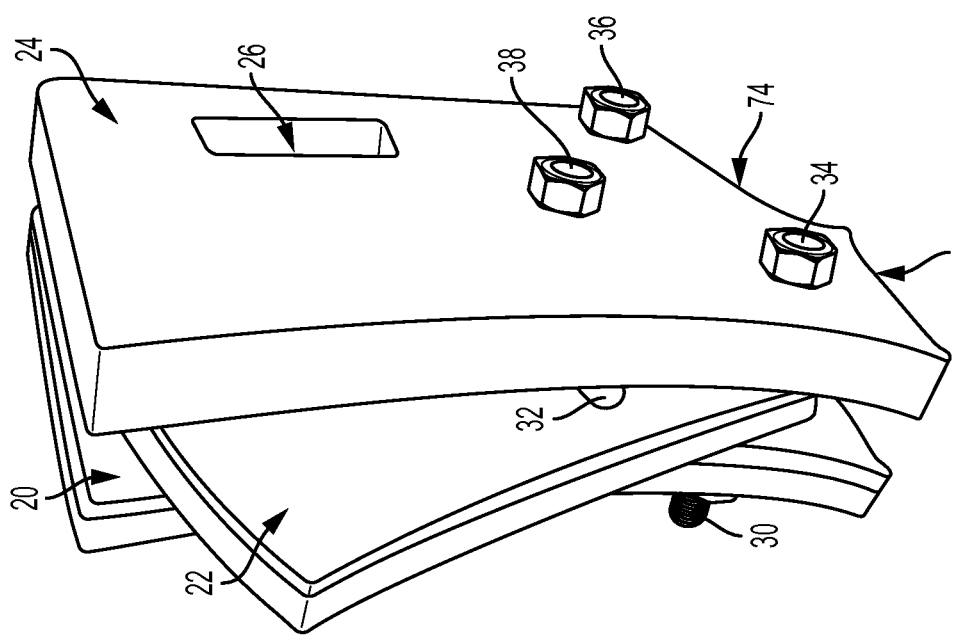
FIG. 4 is a perspective view of the seating recline fixture shown in FIG. 3.

FIG. 4 illustrates some of the features of the seat recline fixture 18 in greater detail. As shown in FIG. 4, the seat recline fixture 18 defines surfaces that enable it to be disposed on the seating assembly 10 (see FIG. 3) in a stable manner for usage. Rear and forward contours 74, 76 allow the seat recline fixture 18 to be seated in the junction between the vehicle seat bottom 14 and the vehicle seat back 12, in a relatively flush manner. The rear and forward contours 74 and 76 provide support for the right and left plates 20 and 24 so that they maintain a fixed position flush to the seating assembly 10 relative to the center plate 22, which as indicated above can change its position as the angle of inclination of the seating assembly 10 is changed.

The contours 74 and 76 may be designed for particular seating assembly 10 configurations, which may vary based on vehicle models, or may be standardized for classes of vehicles (such as all SUV's from a particular manufacturer). Some vehicles provide options for consumers to choose different seating assemblies 10 (such as leather versus fabric), and the contours 74 and 76 may change depending on the customer's choice. The contours 74 and 76 may also be designed to be adaptable to any vehicle seating assembly 10, such as by utilizing further spring mounted components to allow the contours 74 and 76 to be moved and thereby adapt to different vehicle makes and models, allowing the same seat recline fixture 18 to be used with different seating configurations.

In FIG. 4, the seating recline fixture 18 is in its default, non-compressed state, i.e., where the protruding portion of the center plate 22 protrudes beyond the right and left plates 20, 24 (which is also referred to herein as the no-go position). In the embodiment depicted in FIG. 4, a biasing device, such as a torsion spring 68 (shown in greater detail in FIG. 11), is mounted at the center plate 22 to influence or otherwise bias the center plate 22 to protrude beyond the right and left plates 20, 24. FIG. 4 further illustrates the viewing window 26, which can be formed in one or both of the right and left plates 20 and 24.

The three plates 20, 22, and 24 are generally connected together by bolts, the heads of which are shown in FIG. 4, i.e., pivot bolt head 34, slide bolt head 38, and rear bolt head 36. FIG. 4 also shows a bolt shaft (rear bolt thread shaft 30) of one of the bolts that protrudes outwards from the right plate 20. These bolt assemblies are discussed in more detail below.

Figure 5:
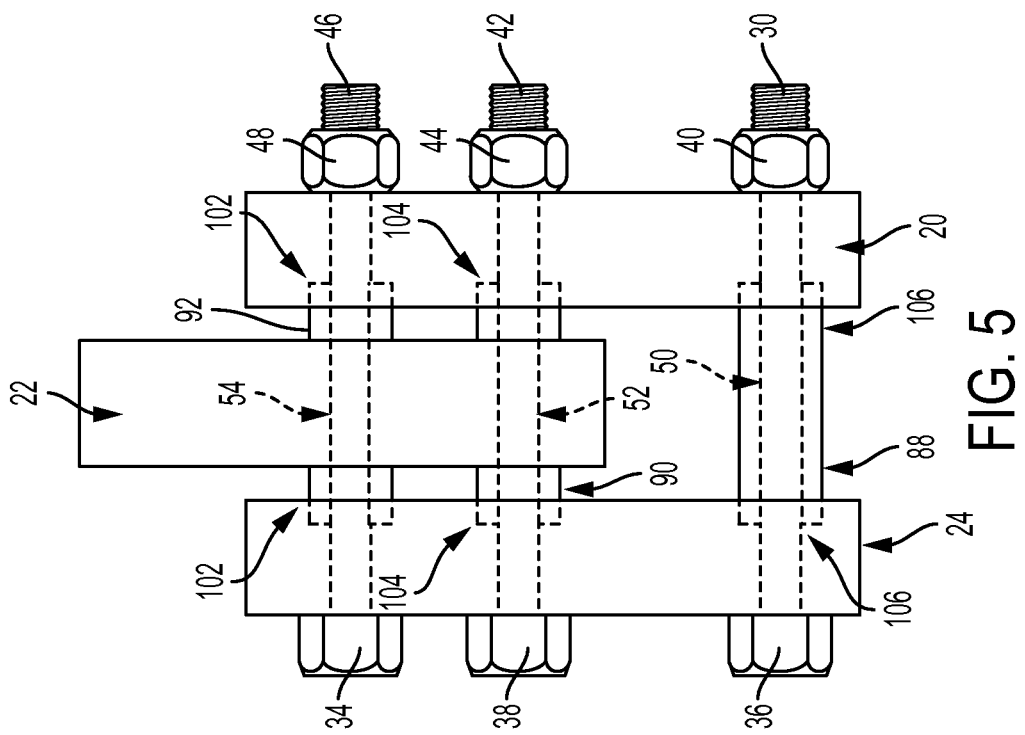
FIG. 5 is a top view of the seat recline fixture of FIG. 4.

FIG. 5 is a top view of the seat recline fixture of FIG. 4, and illustrates the bolts and bolt securing fixtures in greater detail (such as the thread shafts, bole sleeves, bolt nuts, etc). For example, FIG. 5 depicts the right, left and center plates 20, 22 and 24, pivot bolt 54, rear bolt 50, slide bolt 52, rear bolt thread shaft 30, pivot bolt thread shaft 46, and slide bolt thread shaft 42. FIG. 5 also depicts a pivot bolt nut 48, slide bolt nut 44, and rear bolt nut 40, and optional bolt sleeves, rear bolt sleeve 88, slide bolt sleeve 90, and pivot bolt sleeve 92. In some embodiments, the bolt sleeves 88, 90, 92 may be fitted into recesses of the right, center, and left plates 20, 22, 24 (pivot sleeve recesses 102, slide sleeve recesses 104, and rear sleeve recesses 106).

The sleeve recesses 102, 104 and 106 provide a mechanical stop for the bolt sleeves 88, 90, and 92 to establish a predetermined transverse separation between the plates 20, 22, and 24. This separation can facilitate rotation of the center plate 22 without sliding directly against the right and left plates 20 and 24, causing friction. In other words, this separation prevents or impedes the plates from being secured very tightly and thereby prohibiting any movement of the center plate 22 relative to the right and left plates 20 and 24. However, the recesses 102, 104 and 106 may not be necessary, and may be replaced by bolt sleeves 88, 90 and 92, which simply have larger diameters than the bolt through holes 58, 60 and 62 and would thereby also provide a static mechanical separation between the plates.

The above assemblies, recesses, etc. are merely disclosed for exemplary purposes. Embodiments are intended to include or otherwise cover any methods or apparatus for connecting the plates 20, 22, 24 together in such a way that an application of force to a biased protruding portion of the center plate 22 causes the protruding position to move to a different position between the right and left plates 20, 24. Thus, some embodiments include more or less bolts, or the bolts may be omitted entirely in favor of other fastening fixtures or other materials capable of fastening the plates 20, 22 and 24 of the seat recline fixture 18 to one another. The plates 20, 22 and 24 may also be attached by rubber, composite, or any other materials, or may be attached during production in a unitary or integral manufacturing process. The seat recline fixture 18 may also include padding, insulation, springs, or other shock absorbing or protective materials between each or any of the right plate 20, center plate 22, or left plate 24.

Figure 6:
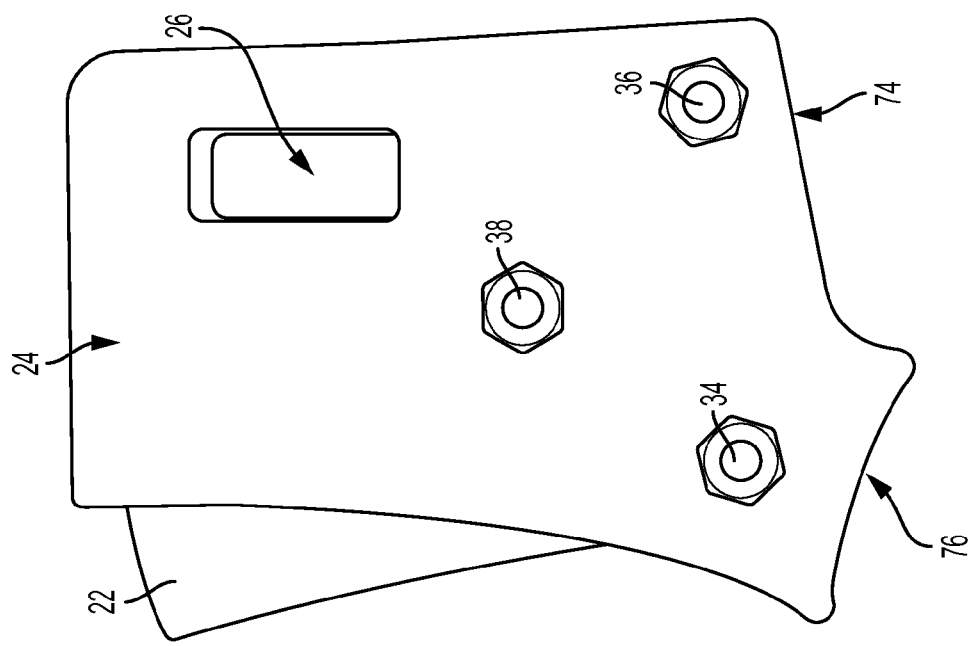
FIG. 6 is a side view of the seat recline fixture of FIG. 4, in a default state where no forces are acting on a center plate.

FIG. 6 is a side view of the seat recline fixture 18, and illustrates the left and center plates 22, 24, the pivot, slide, and rear bolt heads 34, 38, and 36, and the viewing window 26. In FIG. 6, the center plate 22 is in a default state of protrusion where no forces are acting on the center plate 22. This state of protrusion is maintained by a balance of forces between the biasing device (torsion spring 68 shown in FIG. 11) and other structures, such as the slide bolt 52 abutted against the rear-most portion of the center plate slide assembly 32 (shown in FIG. 5). In FIG. 6, viewing window 26 would enable a user to view a section of the center plate 22 (such as a region that does not display the center plate detection region 66), indicating that the center plate 22 remains in its biased protruding position, i.e., a force of sufficient strength has not been imparted on the center plate 22 to cause it to be deflected from its default position.

Figure 7:
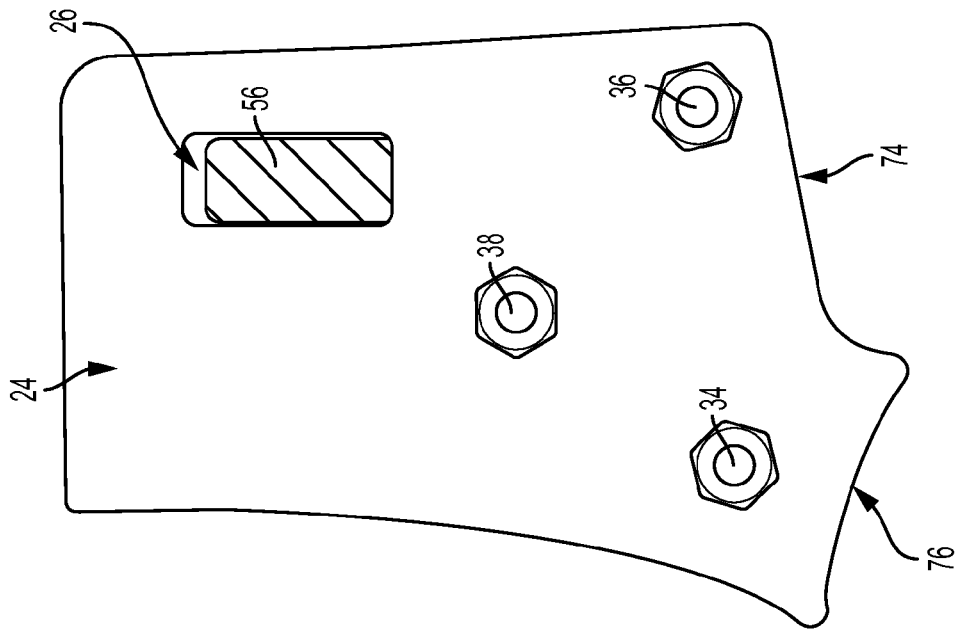
FIG. 7 is a side view of the seat recline fixture of FIG. 4, in a state where the center plate has been retracted.

FIG. 7 is a side view of the seat recline fixture 18 of FIG. 4, in a state where the center plate 22 has been retracted, and illustrates the seating recline fixture 18 when it is in a "go" state. As illustrated in FIG. 7, the viewing window 26 displays a hatched color, pattern, texture, or any other imagery provided on the center plate 22. The viewing window 26 may provide this feedback to an operator, passenger, technician, etc. to inform them that the status of the angle of inclination of the seating assembly 10 is in a "go" or a "no go" state, or may also indicate a specific angle of the seating assembly 10, such as "74°".

FIG. 7 shows the center plate 22 in a completely retracted state. However, the "go" state may be a state in which the center plate 22 is only in a partial state of retraction.

FIGS. 8-11 illustrate some of the basic components of the right, left, and center plates 20, 24 and 22, and detail certain structures that may be used in a few embodiments. FIG. 8 is a side view of the left plate 24, and depicts the pivot, slide, and rear bolt through holes 58, 62 and 60, respectively, as well as the rear and forward contours 76 and 74, and the viewing window 26.

FIG. 9 illustrates the center plate 22 including the torsion spring fixture 64, pivot bolt through hole 58, center plate slide assembly 32, and center plate detection region 66. The pivot bolt 54 fits through the pivot bolt through hole 58, securing the center plate 22 to a pivotal axis and allowing radial movement about the pivot bolt through hole 58. The slide bolt 52 fits into the slide bolt assembly 32, and the slide bolt assembly 32 allows the center plate 22 to move angularly relative to the slide bolt 52 (and thus also relative to the right and left plates 20 and 24). FIG. 9 also illustrates a torsion spring fixture 64 that can be used to mount the torsion spring 68 on either side of the center plate 22 to make contact with the right or left plates 20 and 24.

The center plate 22 may also define pivot or slide recesses 102 and 104 to provide transverse mechanical stops to the pivot and/or slide bolt sleeves 92 and 90. Alternatively, and as previously mentioned, the pivot and/or slide bolt sleeves 92 and 90 may include other features, such as rubber insulation or other insulating or securing features in or about the pivot bolt through hole 58 or center plate slide assembly 32.

The center plate detection region 66 shown in FIG. 9 may be a solid color, color gradient, pattern, texture, imagery, etc. This region 66 may even involve electronic or electromagnetically detectable structures capable of relaying the seating assembly 10 angle of inclination to a vehicle operator or technician.

FIG. 10 illustrates the right plate 20, as well as the pivot bolt, slide bolt, and rear bolt through holes 58, 62 and 60. FIG. 10 further illustrates the rear and forward contours 74, 76. The right plate 20 is illustrated as having multiple layers of thickness (slices). These layers may provide additional support, such as to impede fracture under the strain of the bolt heads 34, 36 and 28, or the nuts 40, 44, and 48. Although FIG. 8 depicts the left plate 24 as having only a single layer, the left plate 24 may also be composed as a multi-layered structure. Each of these elements may be formed of plastics, metals, composite materials, woods, or any other material.

FIG. 11 depicts the torsion spring 68, which is disposed in the torsion spring fixture 64 of the center plate 22. The torsion spring 68 biases the center plate 22 to protrude beyond the right and left plates 20, 24.

B. Interaction of Elements

As a force is applied to the center plate 22 (such as the angular force of the seat back 12 pushing against the center plate 22), the torsion spring 68 becomes compressed, and begins storing mechanical potential energy. This compression can ultimately cause the seat recline fixture center plate 22 to move radially about the pivot bolt 54 along a path constrained by the geometry of the center plate slide assembly 32. The slide assembly 32 provides a track for the slide bolt 52 to move through, and also provides mechanical stops at either end of the center plate slide assembly 32 that prevent or impede further movement of the center plate 22. When the slide bolt 52 reaches a mechanical stop at either end of the slide bolt assembly 32 (on either the default or maximally compressed ends of center plate the slide bolt assembly), the center plate 22 reaches a state of physical equilibrium between the mechanical stop of the center plate slide assembly 32 and the torsion spring 68.

In particular, as the seat recline fixture center plate 22 begins to be compressed from its default state of protrusion to a lesser angle of protrusion (relative to one or more planes defined relative to the seat recline fixture right plate 20 and/or the seat recline fixture left plate 24), the center plate detection center 66 begins to come into view through the viewing window 26. The colors, numbers, patterns, or combinations of any of this indicia would notify an operator, technician, mechanic, etc. that the angle of inclination is in (or is not in) a desired state. For example, it may be desirable to adjust the angle of inclination of the seating assembly 10 to adopt a certain angle, e.g., 78°. In this case, the seat recline fixture 18 may be calibrated (or programmed or otherwise configured) to provide a certain display through the viewing window 26 once an angle of 78° has been established between the seat back 12 and the seat bottom 14.

The seat recline fixture 18 may be calibrated, programmed, or otherwise configured to perform other functions in addition to displaying a go/no-go state. For example, the seat recline fixture 18 may utilize a broader center plate detection region 66, which may notify an operator, technician, mechanic, etc. that the angle of inclination of the seating assembly 10 is within a particularly desired angular range (such as 78°-82°) as opposed to being at a specific angle. The center plate detection region 66 may also display color or pattern gradients to indicate the approach of the desired angle, which may notify an individual operating the seat recline fixture 18 to slow down, or to pay closer attention to the seat assembly inclination as the desired angle approaches.

The protruded position of the center plate 22 relative to the right plate 20 and the left plate 24 can be referred to as the "zero position". The zero position is the default position that the seat recline fixture 18 adopts when one or more external weights or forces are not applied to the center plate 22. For example, if the seat recline fixture 18 is not in contact with any other items, the torsion spring 68 would naturally place a biasing force on the center plate 22. This force causes the center plate 22 to protrude beyond a longitudinal plane delimited by either or both of the surfaces facing the seat back 12 of the right plate 20 or the left plate 24.

However, when the seat recline fixture 18 is positioned between the junction of the seat back 12 and the seat bottom 14, the force(s) from the seat back 12 may cause the center plate 22 to move into a compressed position other than the zero position. This occurs because the torsion spring 68 can move into a compressed state, overwhelmed by the external forces, and causing the position of the seat recline fixture center plate 22 to change its angular position. This is due to the change in the angle of inclination of the seat back 12 relative to the seat bottom 14, which will tend to impose an external force on the center plate 22.

The center plate 22 is intended to rotate around a pivotal point that secures the pivotal apex of the seat recline fixture center plate 22 to the seat recline fixture 18 (and between the right plate 20 and left plate 24). This pivotal point is centered on the pivot bolt 54, which provides flexibility for the center plate 22 to rotate about the axis of the pivot bolt through hole 58.

The center plate 22 is further secured by the center plate slide assembly 32. The center plate slide assembly 32 is illustrated in FIG. 9 as being curved, but may be any number of shapes (such as straight, square, oval or oblong, trapezoidal, or any other geometric shape). The purpose of the center plate slide assembly 32 is to provide a secondary way of securing the seat recline fixture center plate 22 to the seat recline fixture 18 while still allowing it to rotate. The role of the center plate slide assembly 32 is to allow the rotational motion of the seat recline fixture center plate 22 relative to the slide bolt 52.

The slide bolt 52 also plays a role in securing the right plate 20 and left plate 24 so as to restrict any significant movement of the right plate 20 relative to the left plate 42 (with the assistance of the pivot bolt 54 and rear bolt 50). However, the slide bolt 52, which may be optionally encased in a slide bolt sleeve 90, can fit into (and remain stationary) in the center plate slide assembly 32 as the center plate slide assembly 32 rotates about the pivotal apex.

In some embodiments, the detection of the angle of incidence of the seating assembly 10 is made possible by outfitting the center plate 22 with the torsion spring 68, which influences the center plate 22 to be in its default (or zero) state of protrusion, but is flexible so as to allow external forces to compress the torsion coil 94 into various continuous states. However, in some embodiments, it is also possible to alternatively or concurrently fasten either or both of the right plate 20 or the left plate 24 to the torsion spring 68.

The torsion spring 68 performs a function of keeping the seat recline fixture center plate 22 in a fixed position relative to each or any of the longitudinal, transverse and vertical planes of the right plate 20 and left plate 24 when there are no exterior forces impinging on the center plate 22. The torsion spring 68 is able to accomplish this task because mechanical energy stored in torsion coil 94 both influences and allows external forces to influence center plate 22. Unlike many other types of springs, the load applied to a torsion spring 68 is typically an axial force, and is applied to the torsion spring via a torque or twisting force, causing the end of the spring to rotate through an angle as the load is applied. This can be useful for holding the seat recline fixture center plate 22 in its relaxed state, while also allowing the seat recline fixture center plate to register its position while pivoting about the pivot bolt 54.

The relaxed state position of the center plate 22 is a position in which the center plate 22 protrudes beyond at least a horizontal and/or a longitudinal plane of the right plate 20 and/or the left plate 24. As previously stated, there are multiple other ways of achieving this relaxed or default state, such as by using different types of springs, magnets or magnetic fields, electric fields, rubber, any combination of these elements, or any other way capable of applying a force to the center plate 22 so that it adopts a fixed position when it is in the default or zero state, but which also allows the center plate 22 to pivot about the pivot bolt 54 when an external force is applied to the center plate 22.

The torsion spring 68 may be replaced with one or more compression springs. Compression springs are designed to operate with a compression load, and have the property that their spring force increases when the compression of the spring increases, in opposition to the shortening of the spring. One example of a compression spring is the traditional vehicle shock spring.

The torsion spring 68 may also be replaced by one or more tension or extension springs, which are designed to operate with a tension load. The tension load causes the spring force to increase as the spring is pulled or stretched.

Torsion spring 68 may also be replaced by a constant spring. In a constant spring, the supported load will generally remain the same throughout a deflection cycle.

Other types of springs that may be used in place of torsion spring 68 include variable springs (resistance of the coil to a load varies during compression), or springs that are instead classified by shape, such as coil springs (springs shaped like coils), flat springs (springs made of flat or conically shaped pieces of metal or other materials), machined springs (springs manufactured by machining bar stock with a lathe and/or a milling operation rather than coiling wire, and which may incorporate features in addition to the elastic element . . . machined springs can also be made in the typical load cases of compression/extension, torsion, etc.), cantilever springs (springs which are fixed only at one end), etc., or any other spring or combination of spring or otherwise elastically deformable elements.

III. Operation of the Seat Recline Fixture

Some embodiments include a seat recline fixture having three plates, i.e., two fixed end plates (right plate 20 and left plate 24), and a spring-mounted center plate 22. The center plate 22 can protrude from either or both of the right plate 20 or left plate 24, based on the spring force provided by a torsion spring 68 in a default position. When the fixture 18 is mounted in the seat bottom 14 of a vehicle, the center plate 22 faces the seat back 12. As the angle of inclination of the seat back 12 relative to the seat bottom 14 is adjusted, the seat back 12 impinges on the elastically flexible center plate 22, causing the angle of protrusion of the center plate 22 relative to the right and left plates 20 and 24 to change. The status of the angle of deflection of the spring mounted center plate 22 can then be determined by viewing colors, numbers, patterns, images, physical textures (such as braille), etc. that are printed on the center plate 22 and viewable through the viewing window 26 on one or both of the end plates 20 and 24.

Thus, the seat recline fixture 18 is capable of using the angular position of the center plate 22 relative to either or both of the right plate 20 and the left plate 24 to detect the angle of inclination of the seat back 12 relative to the seat bottom 14. Alternatively, the seat recline fixture 18 may be capable of detecting the rotation of the seat back 12 about an axis, such as the seat hinge 16 or pivot bolt 54.

The viewing window 26 can display any indicia, which may be printed on a portion of a side of the center plate 22, such as on a center detection center detection region 66, which is capable of relaying any form of mechanical or electronic information capable of being displayed through the viewing window 26. The status of the deflection angle of the center plate 22 may then be determined by an operator or technician using the seat recline fixture 18.

In some embodiments, these forms of information can include directly or indirectly interpreted referential colors, numbers, images, textures, computer read-able media, etc., that may immediately provide an indication as to the angle of inclination of the seating assembly 10, or may gradually come into view, or otherwise be made available to an operator, technician, etc. based on the angle of deflection of the center plate.

For example, the detection region may only come into view when the angle of inclination of the seating assembly 10 is in a "go" state. Alternatively, the detection region may change continuously from a "no-go" color state, pattern, texture, picture etc., to a "go" color state, pattern, texture or picture. The detection region may also employ any other method for detecting the state of angular deflection of the center plate 22, such as providing a digital readout based on a varying resistance or capacitance of the detection region, etc., to inform anyone monitoring the seat recline fixture as to whether the seating assembly 10 is in a desired state of inclination.

The seat recline fixture 18 may also perform another function, such as simply indicating the angle of inclination without regard to a go/no-go condition. This indication may be beneficial for recording an initial seating assembly 10 angle of inclination for future restoration of the angle.

The seating assembly 10 can also be ergonomically designed with seat and seat back contours specific to a particular seating assembly 10. For example, a luxury vehicle may have more curvaceous seating assemblies that provide added comfort for an operator or passengers, whereas an economy vehicle may have more linear or planar seating assemblies 10 with differing geometries. The seat bottom 14 and rear and forward contours 74 and 76 of the disclosed seat recline fixture 18 can fit into the vertex of the seating assembly 10, and may be customized or otherwise made particular to either of the aforementioned seating assemblies 10.

Customized seat recline fixtures 18 may be provided as a standard assembly line tool. In some situations, the seat recline fixture 18 may even employ adaptive methods, such as utilizing additional spring mounted or otherwise spatially conforming the rear and forward contours 74 and 76 to allow a single, general purpose seat recline fixture 18 to operate across multiple differing seating assemblies 10.

IV. Embodiment of FIGS. 12-14

Figure 14:
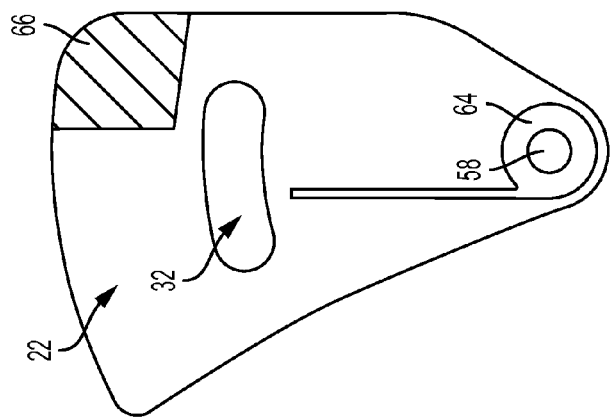
FIG. 14 is a side view of the center plate of the alternative seat recline fixture of FIG. 12.
Figure 13:
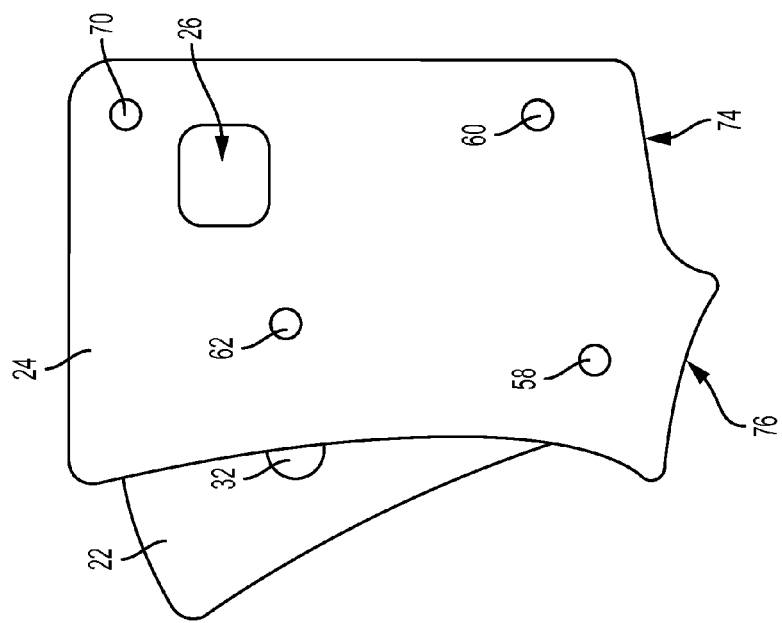
FIG. 13 is a side view of the alternative seat recline fixture of FIG. 12, in a default state where no forces are acting on a center plate.
Figure 12:
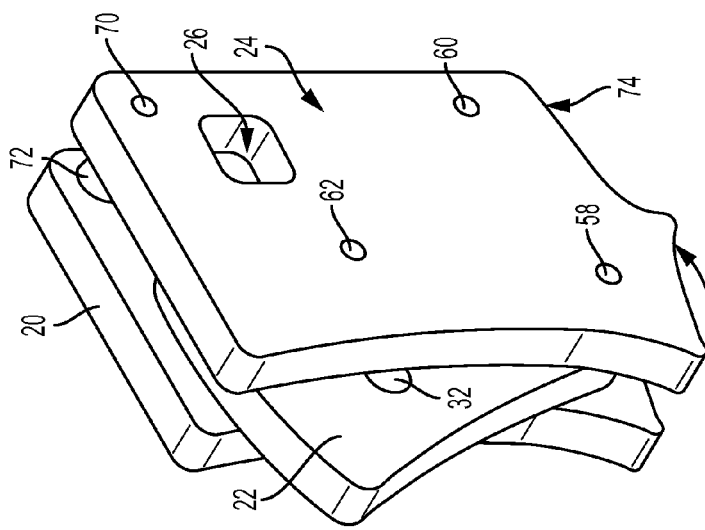
FIG. 12 is a perspective view of an alternative seat recline fixture, in a default state where no forces are acting on a center plate.

FIGS. 12-14 illustrate a second embodiment of the seat recline fixture which is smaller than the previously described embodiment. In particular, FIG. 12 depicts a seating fixture 18 with each of the previously mentioned pivot, slide, and rear bolt through holes 58, 62 and 60, and also depicts an additional ancillary bolt through hole 70 (the actual bolts and bolt heads are not shown). Like the previous embodiment, each of the bolts 50, 52 and 54 (as well as the ancillary bolt, not shown) may be encased in bolt sleeves 88, 90 and 92, and 72, and may be seated in pivot, slide, or rear sleeve recesses 102, 104, 106 (in addition to an ancillary sleeve recess, not shown).

FIG. 12 also illustrates a smaller viewing window 26 and smaller go/no-go display 56. An advantage of this embodiment is that the weight and size of the seating fixture 18 may be reduced. Further, the ancillary bolt can provide added stability to the structure of the seating fixture 18. As with the previously mentioned embodiments, the rear and forward contours 74 and 76 may be fashioned in any way, such as being customized to specific vehicles, vehicle seating assemblies 10, or even to personalized individual vehicle seats.

FIG. 13 illustrates a side view of the second embodiment and illustrates the smaller profile seating fixture 18 with each of the pivot, slide, rear, and ancillary through holes 58, 62 and 60, and 70. In FIG. 13, the left plate 24 and center plate 22 are also visible, in addition to the slide assembly 32. The center plate 22 is depicted as being in the default (zero) state ("no-go" position).

FIG. 14 illustrates the smaller profile center plate 22 used in the second embodiment, and depicts a smaller detection region 66, slide assembly 32, and torsion spring fixture 64.

V. Other Alternate Embodiments

In some other embodiments, the center plate detection region 66 may employ a digital display and/or digital angular detection. For example, the detection region 66 may have materials that change the resistance or capacitance of a current or voltage running exclusively through the center plate 22, and may even monitor a constant or varying resistance, capacitance, or other potential (such as voltage) in the center plate 22 relative to other external fixtures, such as the right and/or left plates 20 and 24. In addition, the detection region 66 may have an ASCII or other digital code embedded in or on the center plate 22 that may be read by a detection head or processor, and displayed on an indicator visible through the viewing window 26. The seating recline fixture 18 may additionally or alternatively employ an audio or vibrational cue to an operator indicating the go/no-go or angle or range of inclination of the seating assembly 10.

Any other technology may also be used to perform the desired function of the seating assembly 10, such as RFID chips, or any other electromechanical system or sub-system. In some embodiments, the viewing window 26 may use other novel technologies, such as using orthogonally polarized films (like the separately polarized films used in each lens of a pair of 3-D glasses) to change the opacity of the detection area in order to notify an operator that the seating assembly 10 is in a go/no-go state. The center plate 22 may also use different types of technologies to maintain or measure its degree of deflection relative to the seat recline fixture right plate 20 or seat recline fixture left plate 24, such as with magnets or magnetic fields, electric fields, eddy currents that circulate in the presence of magnets, or even other technologies such as van der Waals forces, magnetic fluids, etc.

The angle of inclination of the seating assembly 10 may also be determined from other various measurements, such as the degree of compression or displacement of the torsion spring 68, the degree of compression of displacement of other types of springs, the deflection of and other type of material, the resistance of a variable resistor or capacitance of a variable capacitor, or the strength of electric or magnetic fields.

[1] As disclosed above, embodiments are intended to be used with any type of vehicle. Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

[2] While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An indicator assembly for indicating an orientation between a vehicle seat back and a seat bottom, the indicator assembly comprising:
   an outer plate assembly that defines a bottom surface configured to be supported by the seat bottom, and a back surface that faces the seat back when the bottom surface is supported by the seat bottom, the back surface defining a plane that intersects a plane defined by the bottom surface;
   a movable plate that is movably supported by the outer plate assembly;
   a biasing device that applies a biasing force to bias the movable plate toward the seat back when the bottom surface of the outer plate assembly is supported by the seat bottom to thereby define a projecting portion of the movable plate that projects from the back surface of the outer plate assembly toward the seat back, the biasing device also enabling the movable plate to move upon application of a force greater than the biasing force in a direction opposite from the biasing force to reduce a size of the projecting portion that projects from the back surface of the outer plate assembly; and
   an indicator that communicates with the movable plate to indicate a relative orientation between the seat back and the seat bottom based on the size of the projecting portion that projects from the back surface of the outer plate assembly.

2. The indicator assembly according to claim 1, wherein the outer plate assembly includes a pair of outer plates disposed at opposite sides of the movable plate, such that a section of the movable plate other than the projecting portion is disposed between the pair of outer plates.

3. The indicator assembly according to claim 2, further including a pivot bolt that connects the pair of outer plates, and that extends through a pivot aperture that is defined in the movable plate and configured to enable the movable plate to be rotatable about the pivot bolt.

4. The indicator assembly according to claim 3, wherein the movable plate defines an arcuate channel that is spaced from the pivot aperture, and further including a slide bolt that connects the pair of outer plates and that extends through the arcuate channel, such that the slide bolt is movable along the arcuate channel as the movable plate rotates about the pivot bolt.

5. The indicator assembly according to claim 4, wherein the biasing device includes a torsion spring disposed within a recess defined in the movable plate, the torsion spring also being configured to communicate with at least one of the outer plates to provide the biasing force to the movable plate.

6. The indicator assembly according to claim 5, further including sleeves disposed between the pair of outer plates to maintain a minimum distance between the outer plates, with the movable plate being disposed at approximately a midpoint between the outer plates.

7. The indicator assembly according to claim 2, wherein the pair of outer plates are substantially identical.

8. The indicator assembly according to claim 2, wherein the indicator includes an aperture that is defined in at least one of the pair of outer plates.

9. The indicator assembly according to claim 8, wherein the indicator includes a visually identifiable design defined on at least one exterior surface of the movable plate, the visually identifiable design being disposed so as to be viewable through the aperture defined in the least one of the pair of outer plates when the movable plate moves a certain distance opposite to the biasing force of the biasing device.

10. The indicator assembly according to claim 2, wherein the movable plate and the pair of outer plates are configured to enable the entire movable plate to be disposed between the pair of outer plates upon application of a force to the movable plate that is sufficiently greater than and opposite to the biasing force.

11. A method of manufacturing an indicator assembly for indicating an orientation between a vehicle seat back and a seat bottom, the method comprising:
configuring an outer plate assembly to define a bottom surface that can be supported by the seat bottom, and a back surface to face the seat back when the bottom surface is supported by the seat bottom, such that the back surface defines a plane that intersects a plane defined by the bottom surface;
supporting a movable plate with the outer plate assembly to enable movement of the movable plate;
configuring a biasing device to apply a biasing force to bias the movable plate toward the seat back when the bottom surface of the outer plate assembly is supported by the seat bottom to thereby define a projecting portion of the movable plate that projects from the back surface of the outer plate assembly toward the seat back;
disposing the movable plate so as to be movable upon application of a force greater than the biasing force in a direction opposite from the biasing force to reduce a size of the projecting portion that projects from the back surface of the outer plate assembly; and
disposing an indicator so as to indicate a relative orientation between the seat back and the seat bottom based on the size of the projecting portion that projects from the back surface of the outer plate assembly.

12. The method according to claim 11, further including configuring the outer plate assembly to include a pair of outer plates disposed at opposite sides of the movable plate, and disposing a section of the movable plate other than the projecting portion between the pair of outer plates.

13. The method according to claim 12, further including connecting the pair of outer plates with a pivot bolt that extends through a pivot aperture defined in the movable plate, and that is configured to enable the movable plate to be rotatable about the pivot bolt.

14. The method according to claim 13, further including configuring the movable plate to define an arcuate channel that is spaced from the pivot aperture, and connecting the pair of outer plates with a slide bolt that extends through the arcuate channel, such that the slide bolt is movable along the arcuate channel as the movable plate rotates about the pivot bolt.

15. The method according to claim 14, further including configuring the biasing device to include a torsion spring disposed within a recess defined in the movable plate, and configuring the torsion spring to communicate with at least one of the outer plates to provide the biasing force to the movable plate.

16. The method according to claim 15, further including disposing sleeves between the pair of outer plates to maintain a minimum distance between the outer plates, with the movable plate being disposed at approximately a midpoint between the outer plates.

17. The method according to claim 12, further including configuring the pair of outer plates to be substantially identical.

18. The method according to claim 12, further including configuring the indicator to include an aperture that is defined in at least one of the pair of outer plates, and a visually identifiable design defined on at least one exterior surface of the movable plate, the visually identifiable design being disposed so as to be viewable through the aperture defined in the least one of the pair of outer plates when the movable plate moves a certain distance opposite to the biasing force of the biasing device.

19. The method according to claim 12, further including configuring the movable plate and the pair of outer plates to enable the entire movable plate to be disposed between the pair of outer plates upon application of a force to the movable plate that is sufficiently greater than and opposite to the biasing force.

20. A method of indicating an orientation between a vehicle seat back and a seat bottom, the method comprising:
moving the seat back to adopt a reclined position;
placing an indicator assembly on the seat bottom, such that a bottom surface of an outer plate assembly of the indicator assembly is supported by the seat bottom, and a back surface of the outer plate assembly faces the seat back;
moving the seat back in an inclined direction to contact a movable plate of the indicator assembly that is movably supported by the outer plate assembly;
continuing movement of the seat back in the inclined direction to apply a force that exceeds a biasing force applied by a biasing device of the indicator assembly in a direction that is opposite to the direction of the force applied by the seat back so as to move the movable plate in the direction of the force applied by the seat back; and
monitoring an indicator that communicates with the movable plate to determine a relative orientation between the seat back and the seat bottom based on the amount of movement of the movable plate.

* * * * *